United States Patent Office 2,714,108
Patented July 26, 1955

2,714,108

PIPERIDYL ALKYL KETONES

Karl Miescher, Riehen, and Hans Kaegi, Basel, Switzerland, assignors to Ciba Pharmaceutical Products, Inc., Summit, N. J.

No Drawing. Application December 9, 1952,
Serial No. 325,024

Claims priority, application Switzerland January 29, 1952

3 Claims. (Cl. 260—294.7)

This invention relates to 1-methyl-4-[3':4'-dimethoxyphenyl]-piperidyl-(4)-ethyl ketone of the formula

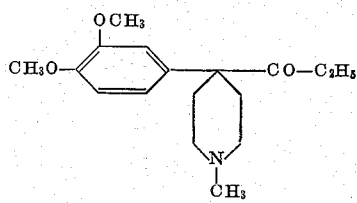

and acid salts thereof.

This new compound possesses an antagonistic action towards central morphine effects and can be used as medicament. This action is specially surprising in view of the fact that the known 1-alkyl-4-[2':3'-dialkoxyphenyl]-piperidyl-(4)-alkyl ketones exhibit a morphine-like action. When the new compound is employed for medicinal purposes in the form of its salts, the acid addition salts with non-toxic or therapeutically applicable acids are utilized.

The new piperidyl ethyl ketone is made by reacting a 1 - methyl - 1 - benzyl - 4 - [3':4' - dimethoxy - phenyl]-4-cyanopiperidinium halide of the formula

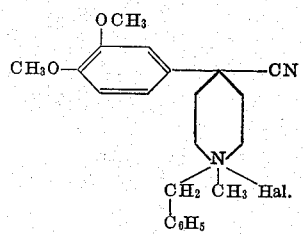

with a methyl magnesium halide. The product of this reaction is decomposed, for example, with water, ammonium chloride solution or dilute acids, especially hydrochloric acid. The benzyl group at the ring nitrogen atom of the resulting quaternary piperidyl ketone can be split off with the aid of catalytically activated hydrogen.

Depending on the conditions of the process the new compound is obtained in the form of the base or its salts. From the free base therapeutically useful salts can be made by reaction with the corresponding non-toxic or therapeutically applicable acids in the usual manner, for example, salts of hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene sulfonic acid or toluene sulfonic acid.

The following example illustrates the invention, the parts being by weight unless otherwise stated and the relationship of parts by weight to parts by volume being the same as that of the gram to the cubic centimeter:

44 parts of 1-methyl - 1 - benzyl-4-[3':4'-dimethoxyphenyl]-4-cyano-piperidinium chloride are ground with a Grignard solution prepared from 7 parts of magnesium, 34 parts of ethyl bromide and 300 parts by volume of ether in a roller mill for 90 hours at 45–50° C. The reaction product is then cautiously decomposed with ice, the ether which contains nothing is poured off, the magnesium sludge is dissolved in 150 parts by volume of water and 50 parts by volume of concentrated hydrochloric acid, and the whole is heated for 1 hour on the water bath. The quaternary ketone-chloride separates as an oily layer. After cooling, the aqueous upper layer is poured off, the oil is dissolved in 200 parts by volume of methanol and 100 parts by volume of water, and is debenzylated by agitation with 5 parts of palladium-carbon and hydrogen. The filtrate obtained after removing the catalyst is strongly concentrated by evaporation and mixed with ammonia. The precipitated tertiary base is taken up in ether and distilled. The yield amounts to 27.1 parts equals 82 per cent of the theoretical yield.

The resulting 1-methyl - 4 - [3':4'-dimethoxyphenyl]-piperidyl-(4)-ethyl ketone is an oil which distills at 146–149° C. under 0.05 mm. pressure.

Its hydrochloride is obtained by dissolving the base in ethyl acetate and adding alcoholic hydrochloric acid. The precipitate which forms is separated by filtration. It is the hydrochloride melting at 195–198° C. In an analogous manner e. g. the above-mentioned salts can be prepared.

The 1-methyl - 1 - benzyl-4-[3':4'-dimethoxy-phenyl]-4-cyano-piperidinium chloride used for reaction with the Grignard compound can be prepared as follows:

88.5 parts of homoveratric acid nitrile and 15 parts of sodium hydride are heated in 200 parts by volume of toluene at the gentle boil under reflux. 93 parts of β-chlorethyl-methyl-benzylamine are run in in portions. When hydrogen is no longer evolved, the whole is cooled and decomposed with water and acidified with dilute sulfuric acid. After removing the toluene, the aqueous layer is mixed with caustic soda solution and the precipitated base is separated and distilled off. The resulting methyl-benzyl aminoethyl-3:4-dimethoxy-benzyl cyanide boils at 189–195° C. under 0.05 mm. pressure and is a light yellow thickly liquid oil.

76 parts of the resulting base are dissolved in 235 parts by volume of toluene. 15 parts of finely pulverized sodamide are added, and the whole is stirred first overnight at room temperature and then for 7 hours at 45–50° C. The whole is cooled to 18–20° C. and, while maintaining this temperature, 34.5 parts of 1:2 - ethylene chloro-bromide are added in portions. The whole is then stirred for a further hour at 18–20° C., decomposed with ice, and the toluene layer is separated. The latter is heated on the water bath for 2 hours, whereby it becomes thick due to the precipitation of salt. The resulting 1 - methyl - 1 - benzyl - 4 - [3':4' - dimethoxyphenyl]-4 - cyano - piperidinium chloride is separated by filtering with suction, washed with acetone and dried at 120° C. It is a white water-soluble powder which has an unsharp decomposition point.

What is claimed is:

1. A compound selected from the group consisting of 1 - methyl - 4 - [3':4' - dimethoxy - phenyl] - piperidyl-(4)-ethyl-ketone of the formula

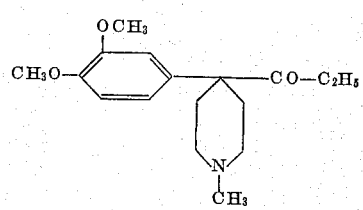

and acid addition salts thereof.

2. The hydrochloride of 1-methyl-4-[3':4'-dimethoxy-phenyl]-piperidyl-(4)-ethyl-ketone.

3. 1-methyl-4-[3':4'-dimethoxy-phenyl]-piperidyl-(4)-ethyl-ketone.

References Cited in the file of this patent

UNITED STATES PATENTS

| | | |
|---|---|---|
| 2,517,695 | Miescher et al. | Aug. 8, 1950 |
| 2,546,159 | Kaegi et al. | Mar. 27, 1951 |

OTHER REFERENCES

Kaegi et al., Helv. Chim. Acta, vol. 32, pp. 2489–2507 (1949), abstracted in C. A., vol. 44, pp. 4907–9 (1950).